United States Patent
Yam et al.

(10) Patent No.: US 9,366,884 B2
(45) Date of Patent: Jun. 14, 2016

(54) AUTOMATIC LENS MAPPING SYSTEM

(75) Inventors: Ran Yam, Jerusalem (IL); Nir Amiel, Zur Hadassa (IL)

(73) Assignee: VISIONIX LTD., Jerusalem (IL)

( * ) Notice: Subject to any disclaimer, the term of this patent is extended or adjusted under 35 U.S.C. 154(b) by 256 days.

(21) Appl. No.: 14/002,745

(22) PCT Filed: Mar. 4, 2012

(86) PCT No.: PCT/IL2012/000107
§ 371 (c)(1),
(2), (4) Date: Aug. 4, 2014

(87) PCT Pub. No.: WO2012/117398
PCT Pub. Date: Sep. 7, 2012

(65) Prior Publication Data
US 2014/0340672 A1    Nov. 20, 2014

Related U.S. Application Data

(60) Provisional application No. 61/448,692, filed on Mar. 3, 2011.

(51) Int. Cl.
  *G01B 9/00*    (2006.01)
  *G02C 13/00*   (2006.01)

(52) U.S. Cl.
  CPC .................................. *G02C 13/003* (2013.01)

(58) Field of Classification Search
  CPC .......... G01B 11/24; G01B 5/20; G01B 11/00; G01B 11/255; B24B 49/00; B24B 9/146
  USPC ......................................... 356/124, 244, 601
  See application file for complete search history.

(56) References Cited

U.S. PATENT DOCUMENTS 4,115,924 A    9/1978  Kleinkopf
5,724,119 A    3/1998  Leight
(Continued)

FOREIGN PATENT DOCUMENTS

DE         29720247 U1    1/1998
DE     10 2004 045636 A1  2/2006
(Continued)

OTHER PUBLICATIONS

PCT International Search Report and Written Opinion of the ISA, mailed Aug. 17, 2012 in PCT/IL2012/000107.
Quercioli F et al: "Optomechanics with Lego", Applied Optics, Optical Society of America, Washington, DC; US, vol. 37, n. 16, Jun. 1, 1998, pp. 3408-3416.
(Continued)

*Primary Examiner* — Tarifur Chowdhury
*Assistant Examiner* — Isiaka Akanbi
(74) *Attorney, Agent, or Firm* — Daniel J. Swirsky; AlphaPatent Associates Ltd.

(57) ABSTRACT

A system for holding and aligning spectacles such that mapping measurements of the optical properties of a lens can be performed with the lens held such that its optical axis is parallel to the incident measurement beam. This may be implemented using three points which define a plane with which a surface of the lens can be aligned. The frame gripper is constructed such that the lens to be measured is free to rotate in space around any axis until clamped by the three alignment pin support arrangement, with the exception of rotation around the optical axis of the lens. This freedom of rotation allows the lens to be positioned on the alignment pin support automatically without the need for operator intervention. The spectacle frame is clamped using a spring loaded caliper device, configured to sequentially align the mechanical center of each lens with the measuring beam.

19 Claims, 10 Drawing Sheets

(56) References Cited

U.S. PATENT DOCUMENTS

| | | | |
|---|---|---|---|
| 5,825,476 | A | 10/1998 | Abitbol |
| 5,855,074 | A | 1/1999 | Abitbol et al. |
| 6,497,482 | B1 * | 12/2002 | Matsuyama ............ B24B 9/144 351/41 |
| 7,721,452 | B2 | 5/2010 | Koyama |
| 8,220,168 | B2 * | 7/2012 | Miyashita ................ G01B 5/20 33/200 |
| 2003/0071961 | A1 | 4/2003 | Schubert |
| 2003/0182813 | A1 * | 10/2003 | Suzuki .................... B24B 9/144 33/200 |
| 2003/0202153 | A1 | 10/2003 | Schubert |

FOREIGN PATENT DOCUMENTS

| | | |
|---|---|---|
| EP | 0 343 979 A2 | 11/1989 |
| EP | 0977026 A1 | 2/2000 |
| JP | S61120940 A | 6/1986 |

OTHER PUBLICATIONS

Extended supplementary European search report, in corresponding European Patent Application No. 12752421.3, dated Aug. 17, 2014.

Examination Report in corresponding European Patent Application No. 12752421.3, dated Mar. 23, 2016.

* cited by examiner

AUTOMATIC LENS MAPPING SYSTEM

CROSS-REFERENCE TO RELATED APPLICATIONS

This application is a U.S. National Phase Application under 35 U.S.C. 371 of International Application No. PCT/IL2012/000107, which has an international filing date of Mar. 4, 2012, and which claims the benefit of priority from U.S. Provisional Patent Application No. 61/448,692, filed on Mar. 3, 2011, which applications are incorporated herein by reference in their entirety.

FIELD OF THE INVENTION

The present invention relates to the field of lens mapping systems using self-centering spectacle frame holders, especially for use in automatic measuring systems.

BACKGROUND OF THE INVENTION

A number of instruments exist for mapping optical elements, and especially for ophthalmic use. Such instruments generally use a Hartman Shack matrix for analyzing the refractions of a beam of light transmitted through the spectacle lens. In U.S. Pat. No. 5,825,476, there is described such a system, and other such systems are cited in that patent. One of the major disadvantages of many of such prior art instruments is that the user places the spectacle frames directly on the measurement table, such that the reference plane used to align the lenses is then effectively that of the frame itself, and not of the lenses being mapped. Consequently, if the lens form has a large element of sag, or if the lens has a large tilt, then the mapping results obtained may be inaccurate. Furthermore, in many such prior art instruments, the frames have to be aligned manually or by means of motors in order to align the mechanical center of the lenses being measured with the measurement beam.

There therefore exists a need for a spectacle measurement system, which can map both lenses automatically and which overcomes at least some of the disadvantages of prior art systems and methods.

The disclosures of each of the publications mentioned in this section and in other sections of the specification, are hereby incorporated by reference, each in its entirety.

SUMMARY OF THE INVENTION

The present disclosure describes new exemplary systems for holding and aligning spectacles such that mapping measurements of the optical properties of the lenses can be performed by the user accurately and speedily. The systems utilize a novel lens aligning system, which ensures that the lens being measured adopts a position with the incident measurement beam parallel to the optical axis of the lens. The lens aligning device may most conveniently be implemented using three points which define a plane with which the lens surface can be aligned. This can be achieved by a set of aligning pins against which one surface of the lens is forced, preferably by a similar set of spring-loaded pressure pins which descend on to the lens to force it against the aligning pins. This arrangement ensures that the lens is always in a predetermined position with the measurement beam incident on the lens normally, independent of the amount of sag or tilt of the lens being measured. A three pin system is the most advantageous arrangement, since all three pins will always be in contact with the lens surface regardless of the surface profile. However, it is to be understood that the invention is not mean to be limited to three pin implementations, but that any other lens aligner device is equally acceptable, such as a ring, so long as the element defines a plane perpendicular to the measurement beam, and that it does not obscure more than a minimal part of the beam path. For convenience, the systems of the present disclosure will be described hereinbelow in terms of the three-pin arrangement, though it is to be understood that this is just one possible implementation.

The system utilizes a novel mechanical holding system which ensures that the lenses are held normal to the measurement light beam, with each lens sequentially positioned over the center of the alignment pins, so that the light passes through the lens in the region of its mechanical center, or through any other predetermined location desired on the lens. Once the spectacle frames have been inserted into the system, the alignment procedure is performed semi-automatically. The clamping system is such that the spectacle frame is free to rotate around all axes and move in the vertical direction while being clamped, such that each lens adopts the optimum position on the alignment pins in the measurement system regardless of the profile of the lens surface. The exception to this is that freedom of rotation is not permitted around the axis perpendicular to the lens, since such freedom of rotation would produce an incorrect reading of the measured cylinder axis of the lens.

A novel aspect of the system from the point of view of the optics is thus that it enables mapping of the lens to be performed without errors induced by lack of knowledge of the tilt or sag of the lens, since the use of the three alignment pin support enables the instrument to bring the lens to a predefined plane perpendicular to the incident measurement beam, essentially regardless of the form of the lens.

A novel aspect of the system from the point of view of the mechanics is thus that the frame incorporating the lens to be measured is held in such a manner that it is free to rotate in space around any axis until clamped by the three alignment pin support arrangement, with the exception of rotation around the optical axis of the lens, as previously explained. This freedom of rotation is what allows the lens to be positioned on the alignment pin support automatically without the need for operator intervention. In general, the freedom of rotation of the frame is described, and is also thuswise claimed, in terms of the Tait-Bryan angles, (or the aeronautical nomenclature for the axes of rotation derived therefrom), in which the yaw axis is the vertical axis parallel to the direction of the light measuring beam and hence perpendicular to the lens being measured, the pitch axis is the lateral axis, for instance the line between the mechanical centers of the lenses, and the roll axis is the longitudinal line, in the plane of the frames but perpendicular to the lateral axis, enabling the frames to rotate from side to side.

Another novel aspect of the mechanics of the system is the manner in which the frame is clamped using a scissors type of action, whose geometry is arranged so that it clamps the frame with the line joining the mechanical center lines of the lenses passing through the center of the positioning pins. As a result, when the lenses are at the measurement positions, the center of the alignment pins, through which the measuring beam should pass, should be on the mechanical center of the lenses.

One exemplary implementation may involve a system for measurement of the optical properties of spectacle lenses, comprising:

(i) a source of light for transmitting a light beam through a lens to be measured, (ii) an optical analyzing unit for analyzing the light beam after transmission through the lens, (iii) a lens aligner disposed in the path of the light beam before the optical analyzing unit, the lens aligner defining a plane perpendicular to the path of the light beam, (iv) a mechanism for pressing the lens into position on the lens aligner, (v) a frame gripper for gripping the lenses of the spectacles, and (vi) a mechanical structure adapted to enable the frame gripper, before clamping of the lens on the lens aligner, to rotate the spectacles freely about both axes orthogonal to that parallel to the path of the light beam.

In such a system, the lens aligner may be a set of three alignment pins or an alignment ring.

The frame gripper may be adapted to center the lens at the center of the lens aligner when the lens is positioned laterally over the lens aligner. In the latter case, the frame gripper may comprise a crossed pair of arms connected in their central region by a pivot joint, each arm comprising a lens gripper at locations on the arm at opposite sides of the pivot, and wherein the frame gripper is disposed in the system such that the pivot joint lies at the center of the lens aligner when the holder is in its central position. The arms may conveniently comprise gripping elements at or near their extremities, the gripping elements being adapted to grip the edges of the lenses. Additionally, the arms may be spring loaded in such a manner as to bias them to grip the edges of the lenses.

The frame gripper may further comprise a ratchet locking mechanism adapted to hold the spring-loaded arms open until the ratchet is released. Additionally, a support wire may be provided, positioned beneath the arms, such that the spectacles are supported thereon while not yet gripped by the frame gripper. The pivot should lies on a line joining the centers of both lenses of the spectacles when gripped in the frame gripper. The position of the pivot of the arms of the frame gripper may advantageously be configured such that the mechanical center of each lens is aligned longitudinally with the axis of the light beam when the lens is positioned over the lens aligner.

Other implementations may further involve a system as described hereinabove, wherein the lens aligner defining the plane perpendicular to the path of the light beam enables measurement of the lens to be performed with an accuracy independent of either of the optical sag or tilt of the lens. Furthermore, the mechanism for pressing the lens into position on the lens aligner may comprise a set of spring loaded pins, each pin being disposed essentially opposite to one of the alignment pins.

Additional implementations can include constructing the mechanical structure to include a journal and bush bearing enabling the frame gripper to perform roll motion, and a double pivot assembly enabling the frame gripper to perform pitch motion and vertical motion. In such an implementation, the journal and bush bearing may comprise a cylindrical journal attached to the frame gripper, adapted to rotate within a bush bearing formed in a base assembly, the base assembly being attached to a mounting assembly connected to horizontal and vertical movement slides on the system. Furthermore, the double pivot assembly may comprise a base assembly to which the frame gripper is rotatably attached, the base assembly being attached at each of its sides by a first pivot joint to a pivot arm, the pivot arm on each side of the double pivot assembly being attached at an end remote from the first pivot joint by means of a second pivot joint to a mounting assembly connected to horizontal and vertical movement slides on the system. Additionally, the system can further comprise an actuator element attached to a controlled vertical motion mechanism, wherein the mechanical structure is attached flexibly to the actuator element, such that when the actuator element is lowered, the structural element is also lowered. In such an embodiment, the controlled vertical motion mechanism should also lower the mechanism for pressing the lens into position on the lens aligner.

Any such systems may further comprise a controlled horizontal motion mechanism, such that the frame gripper can be moved laterally between lenses. The system can then also incorporate control circuitry adapted to control the vertical and horizontal motion mechanisms in conjunction with the optical analyzing unit for analyzing the light beam after transmission through the lens, such that the measurement of the optical properties of spectacle lenses is performed on both lenses sequentially and automatically.

BRIEF DESCRIPTION OF THE DRAWINGS

The presently claimed invention will be understood and appreciated more fully from the following detailed description, taken in conjunction with the drawings in which:

FIGS. 2 and 3 illustrate a lens alignment system used in the presently described instruments, using a three point lens aligning mechanism, comprising three alignment pins; FIG. 2 shows the lens alignment system open, while

FIGS. 4A and 4B are isometric engineering drawings of an exemplary implementation of a complete lens mapping instrument, incorporating the holding mechanisms novel to the present application; FIG. 4A shows a front left view of the instrument, while

FIGS. 8 and 9 show the frame gripper holder mechanism for enabling the desired limited freedom of motion of the frame gripper of FIGS. 5 to 7; FIG. 8 shows the mechanism partly disassembled while

DETAILED DESCRIPTION

Figure 1A:
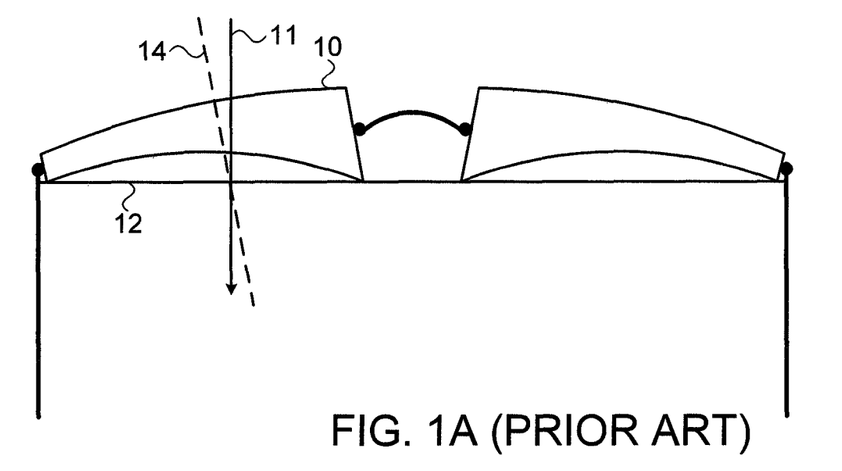
FIGS. 1A and 1B illustrate schematically the positions of spectacle lenses in a prior art lens mapper, relative to the light beam used to measure the lens.
Figure 1B:
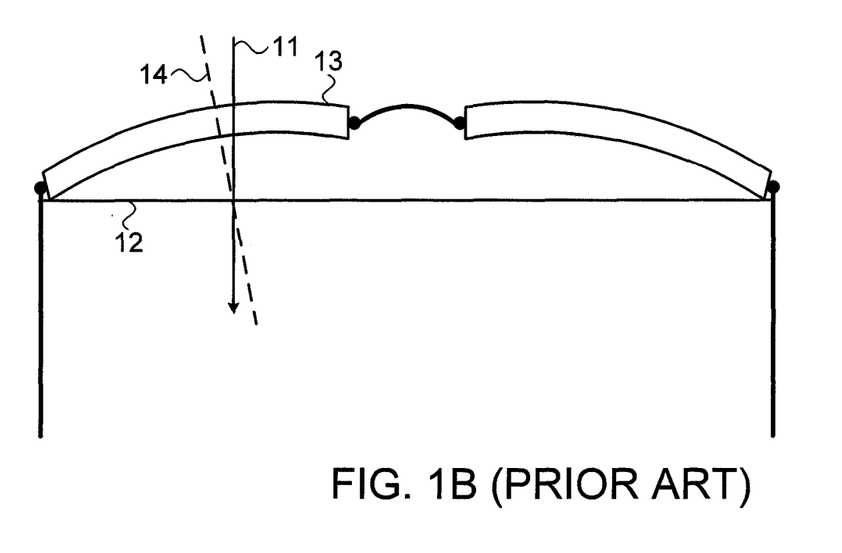

Reference is first made to FIGS. 1A and 1B, which illustrate schematically a problem in the use of prior art ophthalmic lens mappers, in which the complete spectacle frame is mounted on the measurement table. FIG. 1A shows a typically pair of conventional spectacle frames having highly curved lenses 10, while FIG. 1B shows a pair of spectacles, such as fashion sun-glasses, in which the shape of the frame creates a large tilt between the lenses and the measurement table 13. These drawings show the position of a spectacle lens 10, 13, in such a prior art lens mapper, relative to the light beam 11 being used to measure the lens. In such a prior art lens meter, the alignment of the lens being measured is defined by the alignment of the spectacle frames held flat on the measurement table 12. This alignment can also be affected by the overall frame shape. Consequently, in lenses having sharp surface curvatures, or in frames having highly curved shapes, such as those shown in FIGS. 1A and 1B, (where the different curvatures have been exaggerated to more clearly illustrate the phenomenon) the light will not pass through the lens normal to the optical axis of the lens, resulting in inaccuracies of the measurement. This is particularly problematic with negative lenses, and with measurements made on the near vision regions of progressive lenses. The measurement light beam is shown by the solid lines 11 perpendicular to the plane against which the spectacle frame is pressed, whereas a more accurate lens characteristic measurement would be obtained if the light beam were to pass through the lens in the direction parallel to the lens optical axis, as shown by the dashed line 14. In some prior art systems, use of a single pin provides a way to overcome the lack of knowledge of the sag of the lens (the height between the lens apex and the measurement surface). However, no prior art mapping system is known to the applicants in which the tilt of the lens has been taken into account in mapping the lens.

Figure 2:
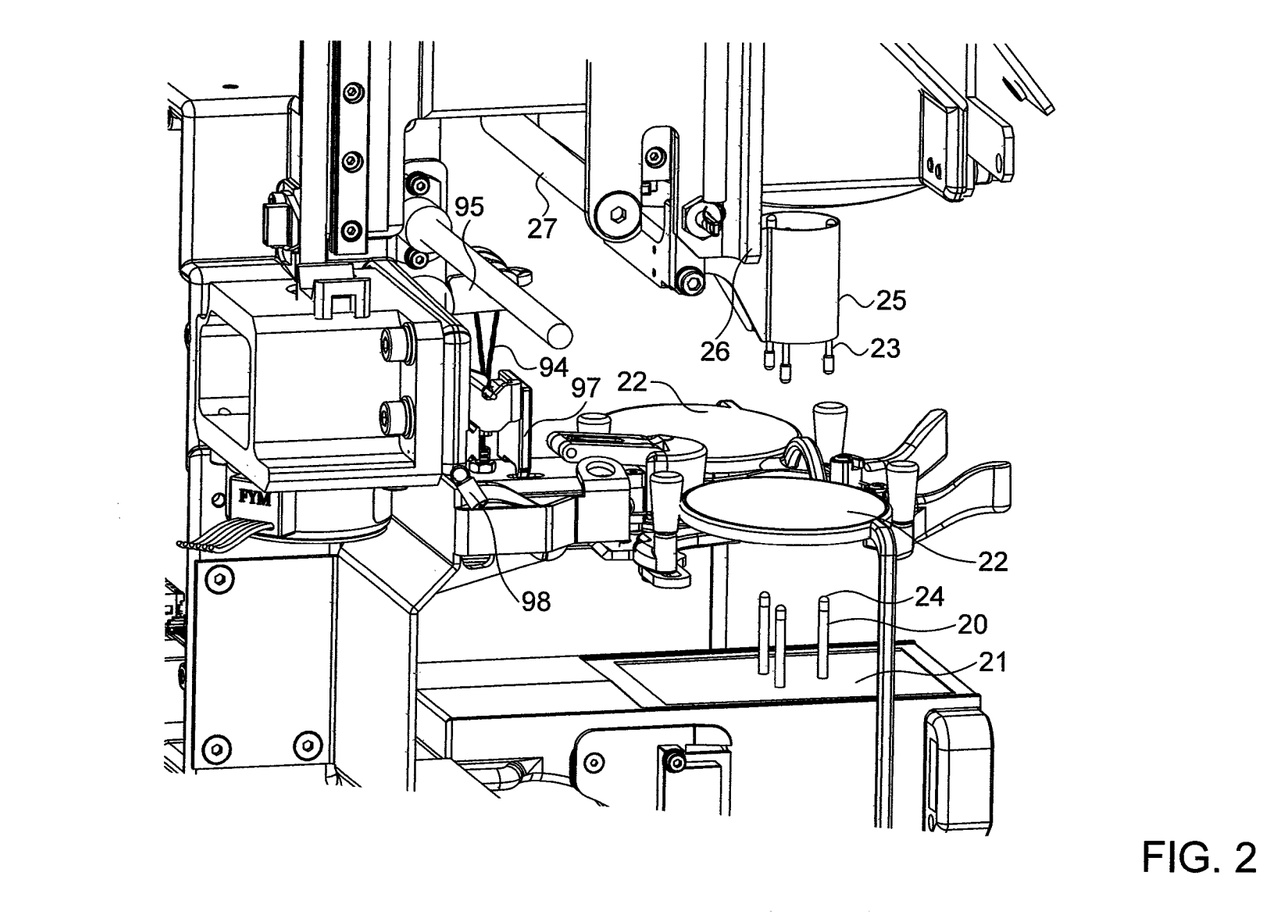
Figure 3:
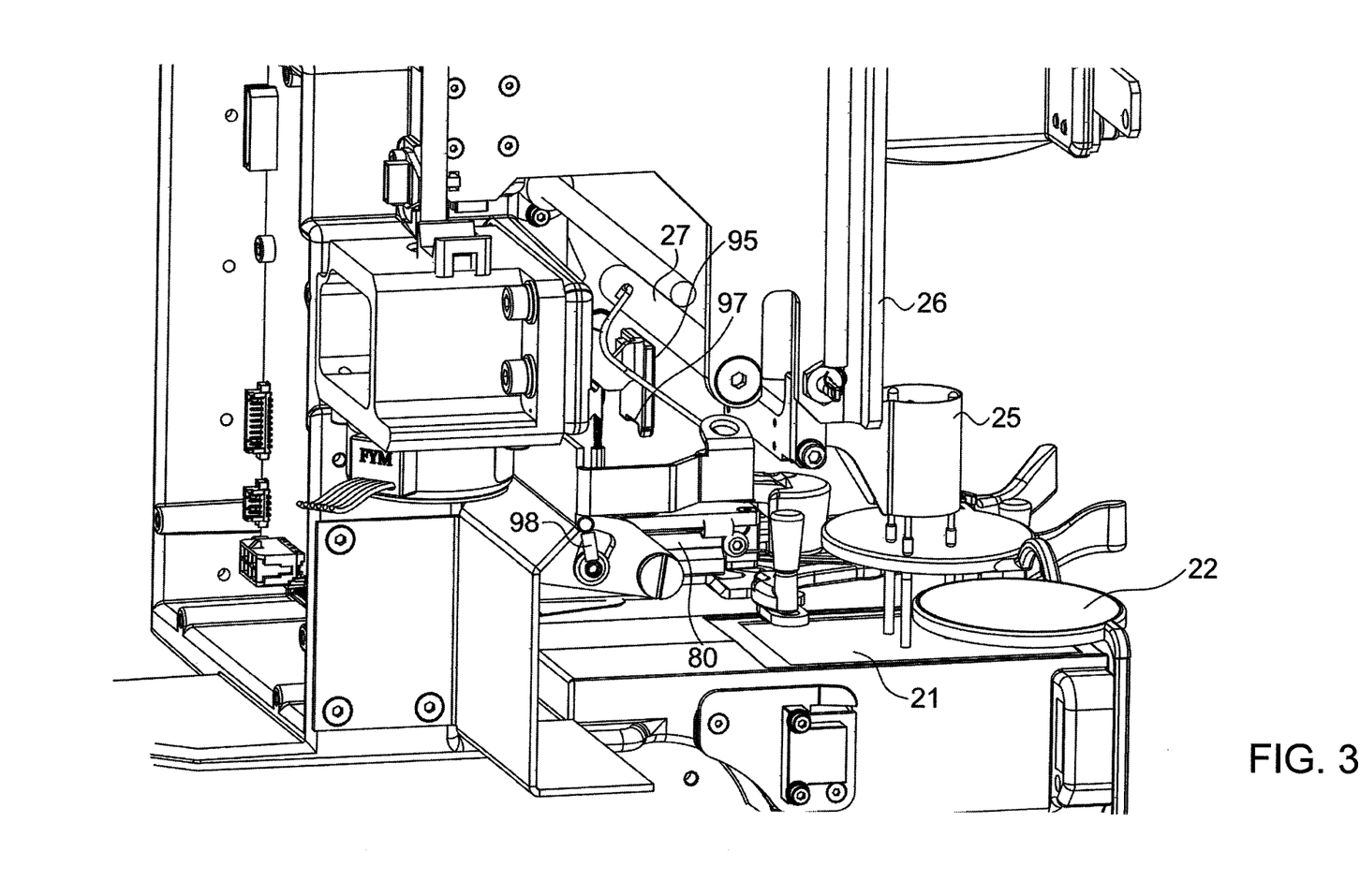
FIG. 3 shows a system with a lens clamped in position for measurement.

FIGS. 2 and 3 now show part of an exemplary lens mapper of the type described in the present disclosure, including a more advantageous lens alignment system, in which the alignment of the lens is defined such that the incident light beam is always directed generally parallel to the optical axis of the lens, by ensuring that it passes through the lens in a direction normal to one of the surfaces of the lens, and at, or nearby to, the optical center of the lens. In order to achieve such an alignment, in the present described system the spectacle frames are inserted into the lens measurement meter in such a manner that the lens to be measured is held such that, up to the point at which it is clamped in its measurement position, it is free to rotate in all directions, with the exception of rotation around its optical axis, which would result in inaccurate cylinder axis measurements. This freedom of rotation is maintained while the lens is being clamped into its measurement position on the measurement table, so that it is clamped in the optimum position for a measurement along the optical axis of the lens. The clamping mechanism ensures that the lens is held in this optimum position once clamped, by the novel lens aligning mechanisms of the present system. When reference is made in this disclosure to the clamping of a lens or a lens frame, it is to be understood that this is intended to include both cases in which the clamping is performed on the frame around the lens, and the case of frameless lenses in which the edge of the lens itself is clamped.

Referring now to FIGS. 2 and 3 again, this is achieved in the exemplary instrument described herein by use of a three point lens aligning mechanism, comprising three alignment pins 20 projecting from the entry window 21 of the beam analyzing unit and preferably arranged to be symmetrically positioned around the central region of the lens. The upper ends of these alignment pins define a plane perpendicular to the direction of the measurement light beam, so that when a lens 22 is pushed into contact with these alignment pins, it is known that at least its lower surface lies in a plane perpendicular to the measurement light beam. This plane is also positioned longitudinally down the optical path so that the light refracted through the lens is correctly incident on the Hartman Shack plate and its imaging lens. The lens is held firmly against the three alignment pins by means of three spring-loaded retractable pressure pins 23, known as blocker pins arranged to descend upon the lens being measured, and push it against the three alignment pins 20. Each of the spring-loaded retractable pins 23 is positioned essentially opposite one of the three alignment pins. The spring-loaded retractable pins 23 are mounted in a pin holder 25, which is lowered when so commanded by the system control, by means of a bracket 26 attached to a motor driven vertical slide. The lower surface of the lens being measured is therefore always aligned perpendicular to the measurement light beam, and any lack of parallelism between the two surfaces, is taken up by the spring-loaded nature of the pins 23 which contact the upper surface of the lens. The upper and lower pins are provided with tips 24 of a soft material such as Teflon, so that damage is not caused to the surfaces of the lenses The use of three pins in this manner, not only defines the plane of the clamped lens in the optimum position for measurement, but also leaves a clear window through the center of the lens in order to perform the optical measurement of the lens. The measurement beam axis should pass through the center of the aligning pins. The construction of the blocker parts and the frame holder parts should be such as to minimize obscuration of the Shack Hartman matrix, or of any alternative detection mode used.

FIG. 2 shows the spectacle frame containing the lens 22 to be mapped in its upper position, where the loading of the frames is performed, and where the frames are moved laterally to switch measurement between lenses. The frame is held freely suspended over the three alignment pins. FIG. 3 shows the lens clamped in position on the instrument, firmly held between the three alignment pins 20 and the three spring-loaded retractable pressure pins 23. Other aspects of FIGS. 2 and 3 will be explained more fully hereinbelow.

Although the lens alignment implementation shown in FIGS. 2 and 3 uses fixed alignment pins mounted on the optical measurement window, and spring-loaded retractable pressure pins to descend onto the lens to clamp it against the fixed alignment pins, it is to be understood that these functions could equally well be reversed, with the fixed alignment pins descending to clamp the lens onto spring-loaded retractable pressure pins mounted on the optical measurement window. In this case, the reference plane defining perpendicularity to the measurement light beam is that of the upper and hence outer surface of the lenses.

Figure 4A:
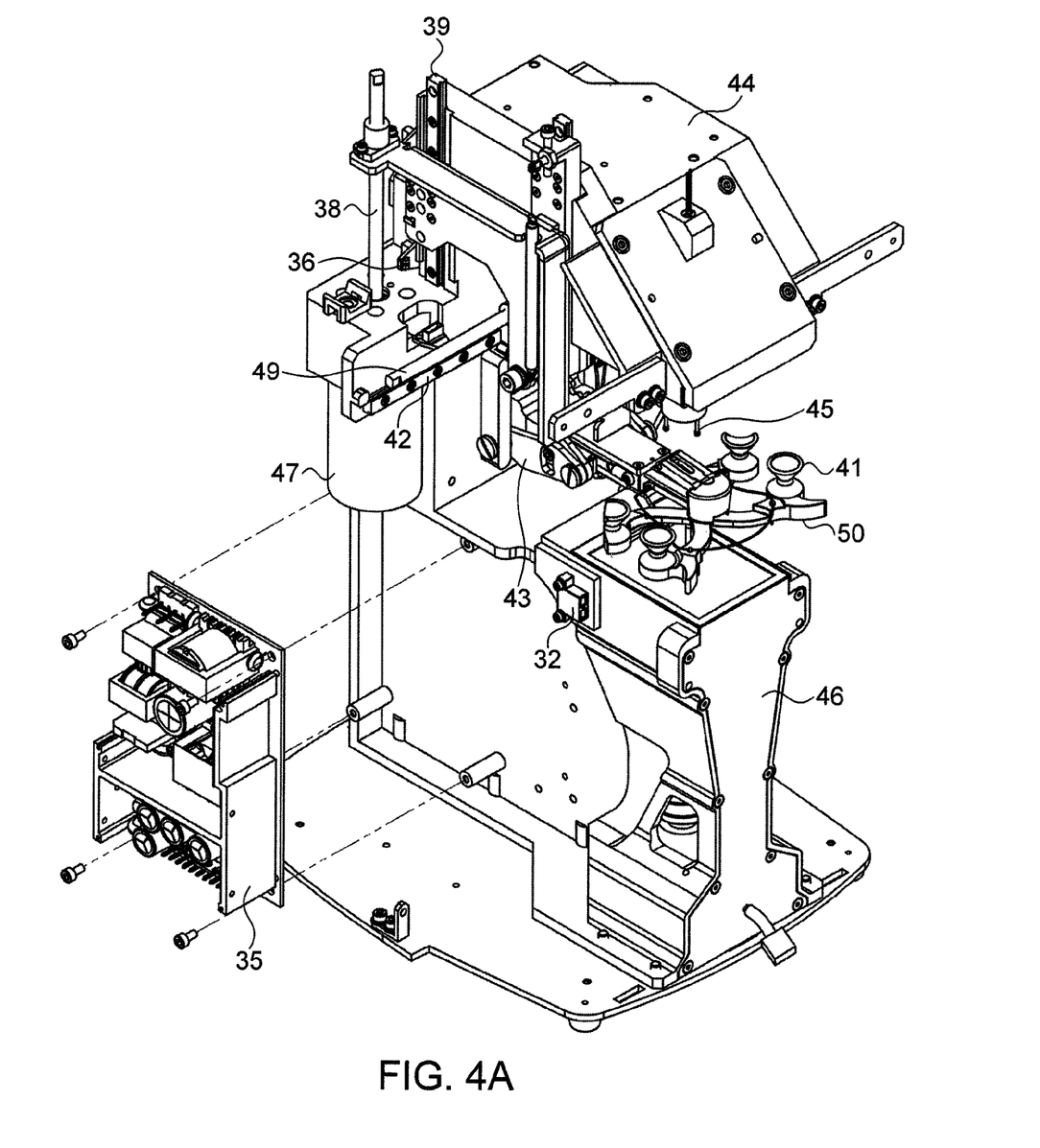
Figure 4B:
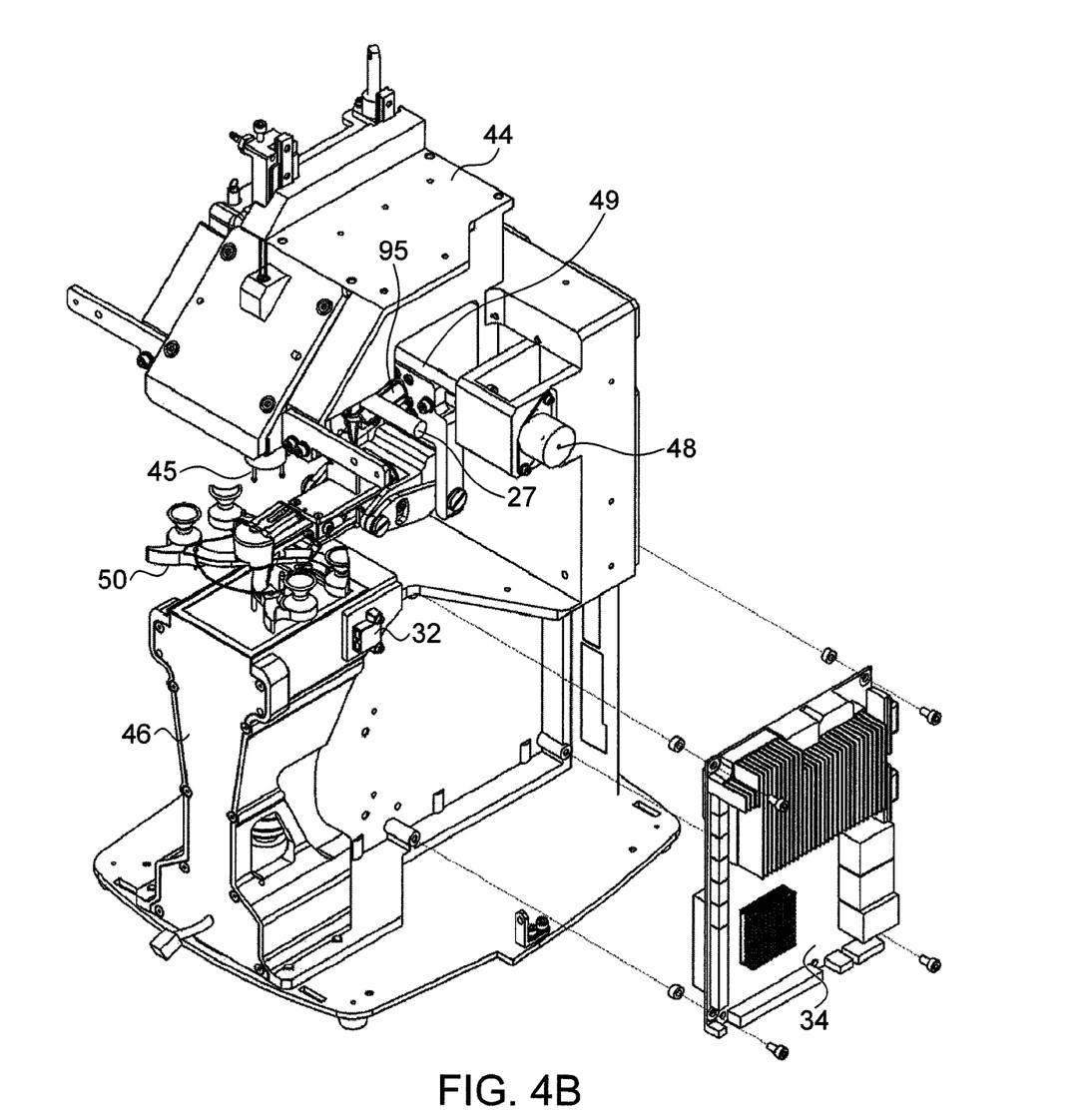
FIG. 4B shows a front right view of the instrument.

Reference is now made to FIGS. 4A and 4B which are isometric engineering drawings of an exemplary implementation of the complete lens measuring instrument with its covers removed, incorporating the holding mechanisms novel to the present application. FIG. 4A shows a front left view of the instrument, while FIG. 4B shows a front right view of the instrument. Relevant mechanical features of the instrument will be discussed more fully below. The spectacles are held within the double conical frame grippers 41, being the gripping elements of the complete frame gripper 50 attached to the instrument by means of the articulated pivot arm 43, whose mechanisms provide for freedom of movement of the frames up to the instant at which they are clamped. The articulated pivot arm 43 is supported from a carriage running on a horizontal slide 42 on the vertical column of the instrument, the carriage being driven by an electric motor 48 through the lead screw 49. This lateral slide motion of the frame carrier is used in order to move the frame laterally from one lens to the other, and to switch between measurements of the two lenses, The optical source for the measurements and the collimating optics are contained within the source module 44, and the optical beam is projected downwards through the central region of the retractable pressure pins 45. After passing through the lens under test, the light is analyzed, according to the exemplary implementation shown in FIG. 4, by means of a Hartman or Hartman Shack plate contained within the optical analysis module 46, and the light deviation resulting from passage through the plate is monitored by means of a CCD camera located in the base of the optical analysis module 46. The vertical movement of the frame carrier, used in order to lower the frames into the lens measurement position on the optical table, and to lower the retractable pressure pins 45 onto the lens being tested, and to raise them once each lens has been measured, is accomplished by means of an electric motor 47, which provides vertical motion to the carriage on the vertical slide 39 by means of the vertical lead screw 38. The carriage carries an actuating rod 27 which pushes a support arm 95 by which the frame gripper is supported. The support arm's function and mode of operation will be further explained in connection with FIGS. 8 and 9 hereinbelow. The power supply 35 and control circuits 34 may be located at the rear of the instrument, on either side, as shown.

Figure 5:
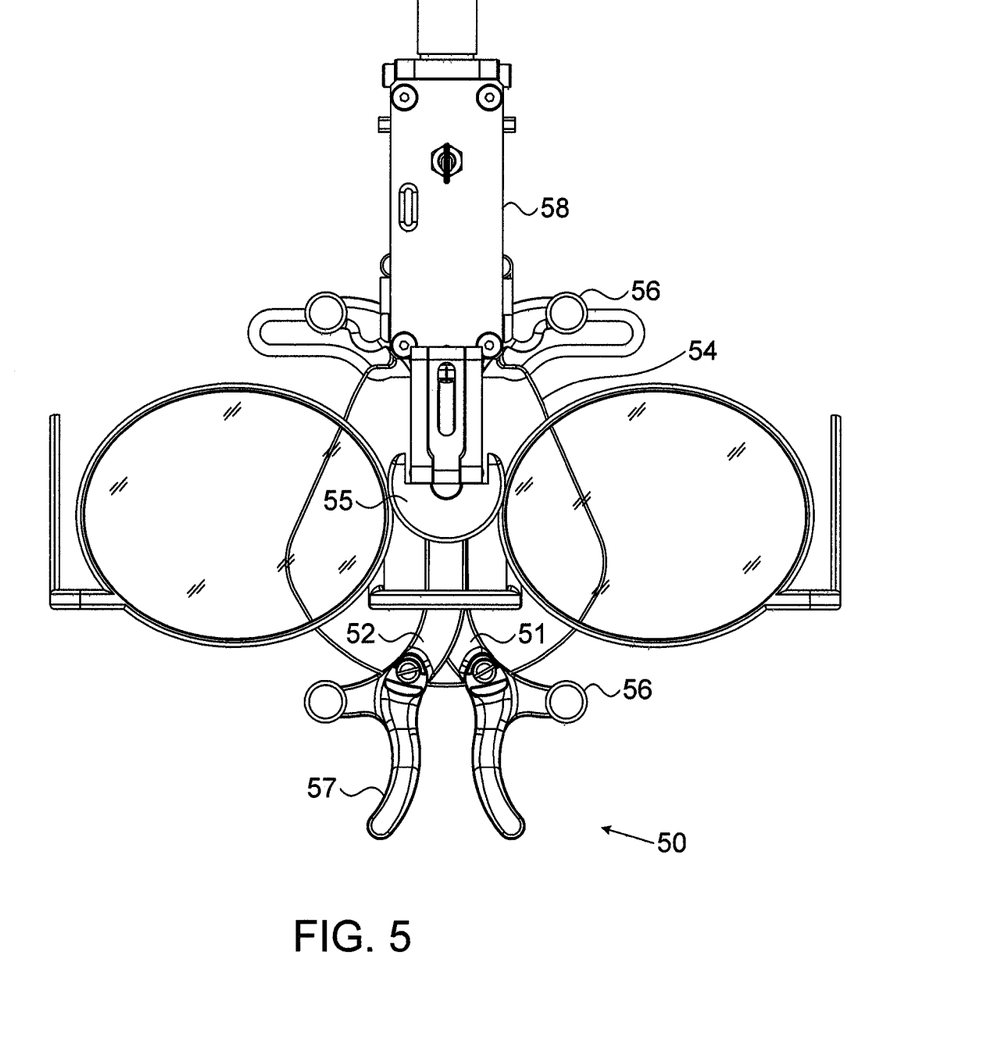
FIGS. 5, 6 and 7 are different views of the frame gripper mechanism used to hold the spectacle frames in a predetermined and centralized position.
Figure 6:
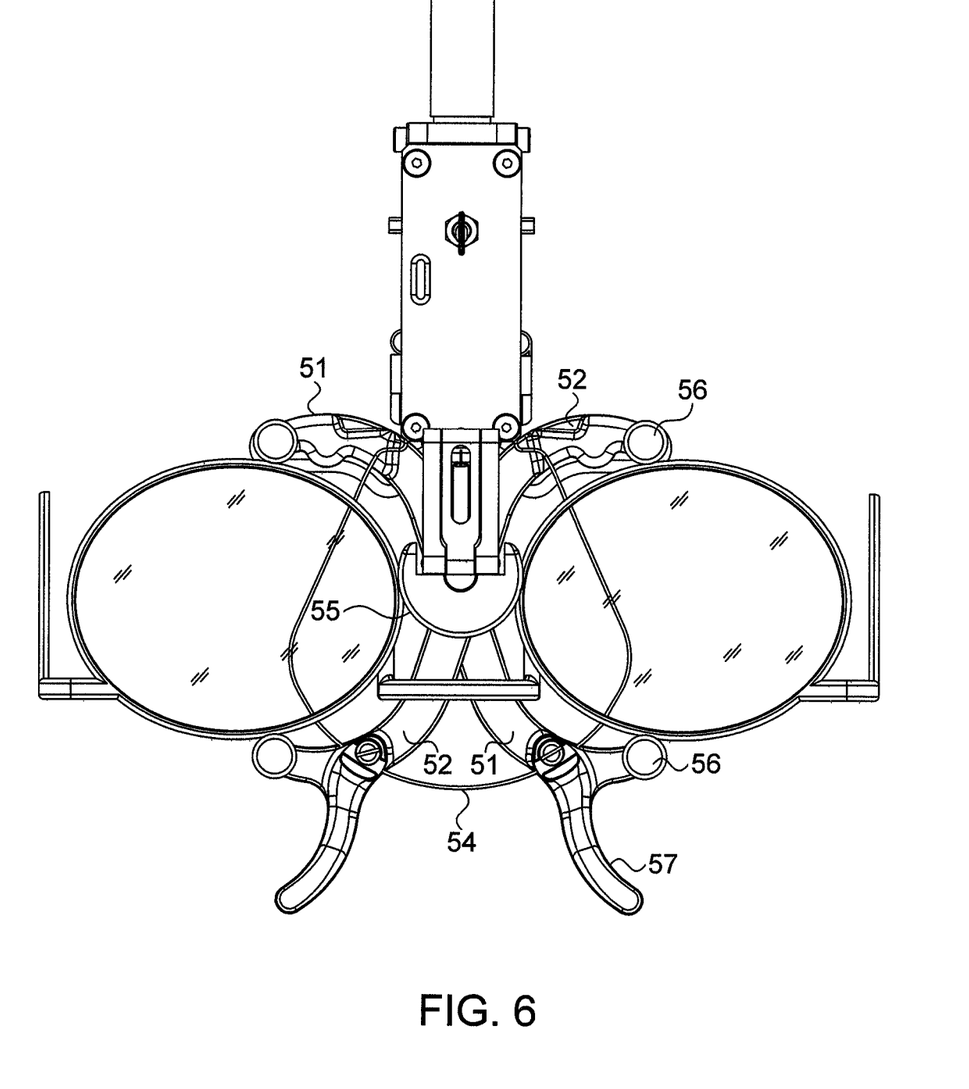
Figure 7:
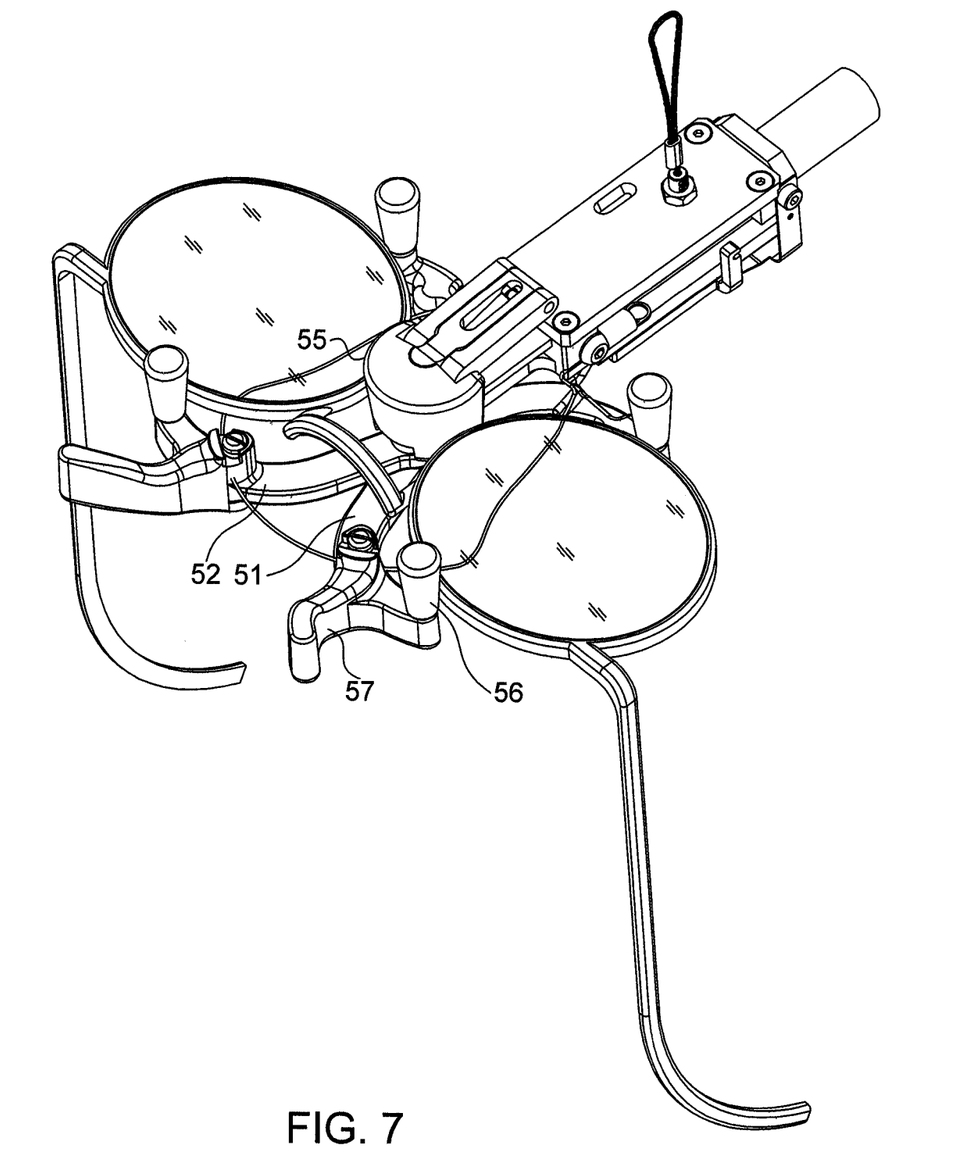

Reference is now made to FIGS. 5, 6 and 7, which illustrate a mechanism used in order to hold the spectacle frames in the frame carrier in a predetermined and centralized position. FIG. 5 is a plan view showing the mechanism in an open position ready to grip a pair of spectacle frames for measurement of its lenses. FIG. 6 is the same view showing the mechanism closed and grasping the frame, while FIG. 7 is an isometric view of the closed mechanism showing how the frame is gripped in a defined position and so that it cannot move in the direction parallel to its lens axes.

Referring back now to FIGS. 5 and 6, it is observed that the frame gripper 50 comprises a mechanism resembling a pair of spring loaded calipers similar in action to a pair of scissors, the two arms 51, 52, being pivoted at the central pivot bearing, situated behind the nose centering element 55, and hence not visible in the drawings. The full extent of each arm of the calipers both sides of the central pivot bearing is clearer from FIG. 6. While the caliper arms or jaws are open, the spectacle frames lie on a frame supporting wire 54 which supports them loosely in a horizontal position until the frame gripper mechanism is closed to clamp them. The frame gripper mechanism incorporates a ratcheted locking mechanism of any suitable type known in the art in the frame gripper support arm 58 which holds the caliper jaws open, until applied finger pressure on the handles 57 unlatches the ratcheted locking mechanism and allows the spring-loaded arms 51, 52 to close onto the spectacle frames. This mechanism enables the operator to insert the spectacle frames into the frame gripper, and to enable them to lock in position with a single handed motion. When the caliper arms are open, the conical frame grippers 56 are held clear of the spectacle frames. The nose centering element 55 is spring biased in the vertically downward direction of the drawing, i.e. in the direction towards the handles 57, so that it maintains contact with the lens frames in the nose gap of the frame as soon as they are inserted into the open frame gripper, maintaining the centered lateral position of the frames. As the caliper arms close onto the frame, the conical frame grippers move inwards to grip the lens frame at the edges of each lens, as shown in FIG. 6. The shape of the cone pushes the lens frame downwards so that it sits firmly on the frame supporting wire 54. At the same time, the nose centering element 55 can move backwards against its spring pressure, pushed by the lenses in the nose gap region, while maintaining constant contact with the frame in the nose gap, thus ensuring centering of the spectacle in the lateral left-right axis. The conical structures of the frame grippers 56 grip the lenses positively, being constructed of a material such as pliant silicone rubber, and are arranged spatially such that they grip the lens with its center line over the center of the alignment pins. This action is shown more clearly in FIG. 7 which is an isometric view, rather than a plan view.

The frame gripper shown in FIGS. 5 to 7 is designed to have a number of concurrently operative positioning functions, which are of importance in ensuring correct alignment of the frames for the optical measurements. Firstly the nose centering element 55, by contacting the space between the lens frames as the caliper arms are closed, is operative to ensure that the spectacle frames are centered laterally, i.e. in the right-left position in FIGS. 5 and 6. Secondly the pivot axis of the caliper arms is advantageously arranged to be aligned with the lateral axis through the center of the alignment pins, such that the pivot lies on the line joining the optical centers of the lenses mounted therein, such that when the frame gripper is closed, the frames are centered in the vertical direction in the drawings so that optical measurements are made around the optical centers of the lenses.

Once the optical measurements on the lenses are complete, pressure on the handles 57 opens the caliper jaws again, out to a position where the ratcheted locking mechanism in the support arm 58 holds them open again without the need for the operator to hold them open, so that the frame may be removed.

The function of the frame gripper as shown in FIGS. 5 to 7 is to provide a convenient way in which to mount and to hold the frames in a predefined reference position for the optical measurements. However, as previously mentioned, one of the important features of the instrument of the present disclosure is that when the frames have been mounted in the frame gripper, they should be allowed to move freely (with the exception of yaw rotation in the horizontal plane, i.e. the plane of the lenses) so that the alignment pins can grip each lens firmly in the required measurement plane position without the frames exerting any limitation on the angular or lateral position which the lenses can adopt, and without the frames hindering the freedom of the lenses to adopt this position. In order to accomplish this, the frame gripper cannot, for instance, be firmly mounted on a vertical slide attached to the horizontal slide on the vertical column of the instrument, since this would not provide it with the desired freedom of movement. In order to accomplish this freedom of movement, a mechanical system is used which enables the required tilt and roll motion of the frame gripper of several degrees, and the vertical motion required so that each lens can adopt the required stance for its measurement as the alignment pins lock it into position. The vertical motion must be sufficient also to cover the vertical range required to lower the frame gripper from its loading position to the measurement position.

Figure 8:
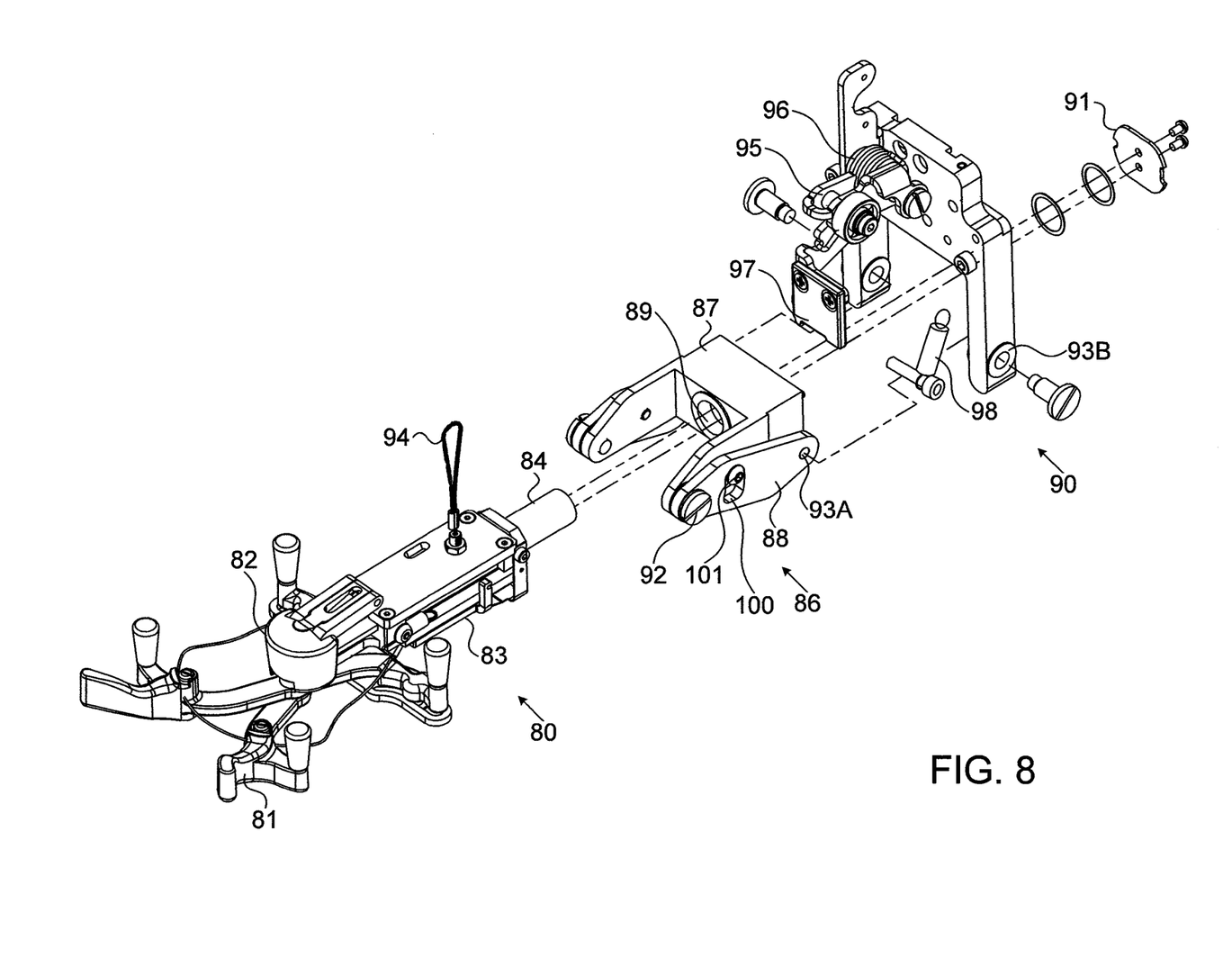
Figure 9:
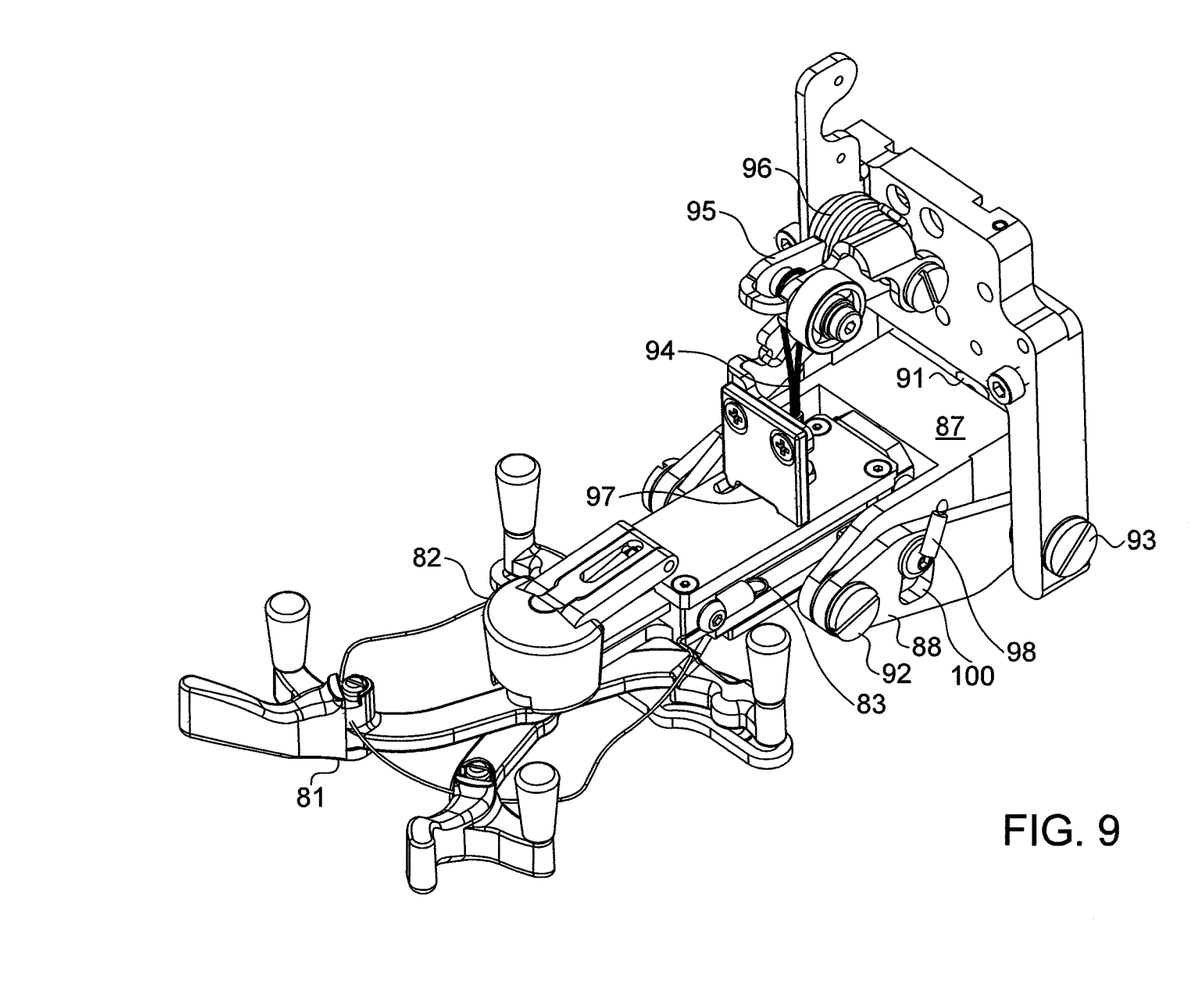
FIG. 9 shows the mechanism completely assembled.

Reference is now made to FIGS. 8 and 9, which show one exemplary implementation of a frame gripper holder mechanism for achieving this aim. FIG. 8 shows the mechanism partly disassembled so that its operative parts can be understood, while FIG. 9 shows the mechanism completely assembled ready for mounting onto the vertical column mounted horizontal slide, used for moving the frames laterally. In the described mechanism, the roll motion is provided by means of a circular bush bearing, while the vertical and pitch motions are provided by means of a pair of sequentially pivoted arms.

Referring now to FIG. 8, there are seen three sub-assembly component parts of this complete mechanism. At the left-hand side there is shown the frame gripper subassembly 80 comprising the frame gripper caliper assembly 81, together with the nose centering element 82 and its deployment mechanism 83, and the roll bearing 84. In the center of the drawing there is shown the sequentially pivoted arm subassembly 86, which enables pitch and vertical motion. At the right of the drawing, there is shown the mounting subassembly 90 used to attach the entire frame gripper holder mechanism to a horizontal slide attached to the vertical column of the instrument, and to ensure that the frame gripper subassembly 80 is lowered to its position close to the alignment pins 20 when the optical measurement is to be made. The structure of each of these subassemblies is now described in terms of their functional operation.

In order to provide roll motion to the frame gripper 81, at the innermost (rearmost) end of the complete frame gripper subassembly 80, there is a cylindrical bearing journal 84, which is adapted to fit into a matching bush housing 89 located in the center of the base section 87 of the sequentially pivoted arm assembly 86. The fit of the bearing journal 84 into the bush 89 is such that free rotation is permitted, but without allowing excessive lateral or vertical motion. The journal 84 is prevented from slipping out of the bearing 89 by means of an end plate 91, which maintains it within the sequentially pivoted arm assembly 86. Since the end plate 91 is attached only to the bearing journal 84, it can rotate with roll of the frame gripper subassembly 80.

If it were necessary to provide only pitch motion to the frame gripper 81, it would have been possible to connect the base section 87 containing the bearing bush 89, to the mounting subassembly and hence to the horizontal slide carriage of the instrument by means of a single axis pivot. However besides the pitch motion it is necessary also to provide free, uncontrolled vertical motion. This is necessary both in order to lower the frame gripper into its measurement position over the alignment pins, and because it is important to allow the pitch motion to take place around an axis centered on the alignment pins, since it is about this point that the lenses must be allowed to freely tilt in order to sit positively on all the alignment pins. This is achieved by allowing vertical motion as well as pitch motion, since the combination of the two can be projected to a pure pitch motion at a distance from the effective pitch pivot, as required. This combination can be achieved by connecting the base section 87 to the mounting subassembly by means of pivot arms 88 having two pivot axes, 92, 93 (93 is shown assembled in FIG. 9). The base section 87 is connected to one end of the pivot arms 88 at the front pivot axes 92, allowing the base section to provide pitch rotation, while the other end of the pivot arms are attached by the rear pivot axes 93A and 93B (shown as 2 items because of the disassembled nature of the pivot in this assembly drawing), allowing the pivot arms to undergo pitch motion relative to the mounting subassembly 90. This double pivot action allows the base section not only to swivel in the pitch direction but also to move up and downwards as the pivot arms perform a swiveling action around their two pivot axes 92, 93, thereby simulating both gross vertical motion and pitch motion around the center of the alignment pins which should be close to the pivot pin of the frame gripper. This two pivot axis motion also requires a small movement in the inward-outward direction of the frame holder. This movement is enabled by ensuring a little lengthwise freedom of journal 84 in bush 89, such as by making the journal 84 slightly longer than the length of the mating bushing bore 89 in the base section 87. The end plate 91 limits the outward motion of the journal 84.

In order to assist in the lowering of the frame gripper assembly 80, so that the combined force of the spring blocker pins 23 would be enough to ensure lens contact with all three locating pins, assist springs 98 may be advantageously used in order to apply more downward pressure to the frame gripper assembly 80 and thus counter the natural imbalance caused by the fact that the center of gravity of the complete spectacle holder mechanism lies behind the center of the locating pins, and closer to the vertical column of the instrument. The lower ends of the spring are attached by means of a screw 99, through an opening 100 in the pivot arms 88 to a point 101 in the central part of the base section 87. The upper ends of the springs may be attached to a convenient fixed post. Since the base section 87 is hinged about the front pivot axis 92, the upward force of the springs 98 on the base section 97 will cause the frame gripper to be pushed downwards, to apply more pressure to the alignment pins.

The mounting subassembly 90 is attached rigidly to the carriage of the horizontal slide, which itself is mounted on the vertical column of the instrument, while the frame gripper assembly 80 and its associated sequentially pivoted arm assembly 86 are pivoted on the mounting subassembly 90 as described hereinabove, to enable their independent freedom of motion. The mounting subassembly 90 also includes component elements for lowering the frame gripper assembly 80 in order to position the lens to be mapped on the alignment pins 20, and to raise the frame gripper assembly when the measurement has been performed, and it is necessary either to move the frames laterally for the other lens to be measured or to remove them completely from the instrument. The weight of the pivoted combined frame gripper assembly 80 and sequentially pivoted arm assembly 86 is supported from a pivoted support arm 95 by means of a cord 94 attached to the frame gripper nose centering deployment mechanism arm 83. The cord 94 may preferably be looped in order to enable easy attachment to the support arm 95. The support arm is attached to the mounting subassembly 90 by means of a pivot (hidden in the views of FIGS. 8 and 9) with a bias spring 96 which holds the support arm 95 in its raised position unless pushed downwards. The upper position of the complete frame gripper assembly 80 and mounting subassembly is limited by the edge 97 of the limit plate, which prevents the spring 96 from pulling the assemblies even higher. The spectacle frame mounted in the frame gripper 81 is thus held clear of the alignment pins unless the support arm 95 is pushed downwards, which occurs when a lens measurement needs to be made. The manner in which this will be accomplished is described hereinbelow.

FIG. 9 now shows the mechanism completely assembled ready for mounting onto the horizontal slide carriage on the vertical column of the instrument. All of the component parts are labeled with the reference characters as used in the assembly drawing of FIG. 8.

Reference is now made back to FIGS. 2 and 3, to illustrate how the frame gripper is moved from its loading, upper position, to its measuring, lower position with the lens firmly clamped on the alignment pins. In FIG. 2, there is seen the support arm 95 and its associated cord 94 supporting the frame gripper with all of its component assemblies, held in the upper position by virtue of the bias spring 96 of FIGS. 8 and 9. The spring loaded support arm is constrained at its upper limit by virtue of the edge 97 of the limit plate. As the instrument control moves the spring loaded retractable pin assembly 25 down in order to prepare for a measurement, an actuator rod 27 attached to the bracket 26, moves down with motion of the bracket, and pushes downwards on the support arm 95, either directly or by means of a rigid link, allowing the frame gripper assembly to descend also. This is clearly shown in FIG. 3, where the frame gripper assembly is at its measurement position, with the alignment pins 20, 23 clamping the lens in position. As is observed, the actuator rod 27 has pushed the support arm 95 to its lower position, and the frame gripper subassembly 80 is clear of the edge 97 of the limit plate. The complete frame gripper assembly position is now defined by the pressure of the alignment pin assemblies 20, 23 on the lens being measured, as assisted by the assist springs 98.

One example of an operating sequence by which the instrument can be used in order to perform a complete automatic mapping sequence of the lenses of a pair of spectacles is now described. The user inserts the spectacle frames in the frame gripper in its home position, this being most conveniently at the center of the lateral travel, the insertion procedure being a simple one-handed operation. Once the frames are correctly located in the frame gripper, the instrument can be started, and the rest of the procedure may be performed automatically by the instrument controller. The first step is for the lateral slide motion to move the frame gripper laterally from the home position until one lens is positioned over the aligning pins. The motion may typically be stopped at the correct position by use of a limit switch. Then the vertical slide control lowers the frame gripper into position, with the first lens clamped by the alignment pins and centered over the optical window for mapping. Once this mapping image has been obtained, the blocker pins 23 are raised, together with the frame gripper, and the horizontal drive moves the frame gripper by the predetermined distance, generally chosen to be the 63 mm standard pupil distance measurement, (though any other distance can be entered into the control for differing circumstances) so that the second lens is now centered over the optical measurement channel. The motor may most conveniently be a stepping motor. The procedure is then automatically repeated for the second lens, and when complete, the frame gripper and blocker pins are raised, and the frame gripper moves to its home position in the center of the instrument travel to enable the frame to be released from the frame gripper.

Since operation of the instrument is automatic, a number of sensors should be advantageously used in the instrument. In the first place, the horizontal and vertical slide drives should be protected from end overruns, by means of limit switches, such as that 36 shown in FIG. 4A on the vertical slide. Stepping motors and encoders can be used to provide positive control of the slide position at all times.

In addition, frame arm sensors 32 can be located on either side of the analyzing module of the instrument, to detect when the lateral motion of the frame gripper is such that the frame arm intersects the line of sight of the sensors 32, at which point, the motion should be stopped. This feature is important when, for instance, children's frames are measured.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A system for measurement of the optical properties of spectacle lenses mounted in their frame, comprising:
   a source of light for transmitting a light beam through a lens to be measured;
   an optical analyzing unit for analyzing the light beam after transmission through said lens;
   a lens aligner disposed in the path of said light beam before said optical analyzing unit, said lens aligner defining a plane perpendicular to the path of said light beam;
   a mechanism for pressing said lens onto said lens aligner;
   a frame gripper; and
   a mechanical structure attached to said frame gripper and comprising an uncontrolled journal and bush bearing aligned to enable said frame gripper to perform roll motion, said journal and bush bearing being in series with an uncontrolled double pivot assembly aligned to enable said frame gripper to perform pitch motion and free vertical motion,
   wherein said alignment of said journal and bush bearing, and of said double pivot assembly are such that said frame gripper rotates said spectacles freely about both axes orthogonal to the path of said light beam.

2. A system according to claim 1, wherein said lens aligner is either a set of three alignment pins, or an alignment ring.

3. A system according to claim 2, wherein said mechanism for pressing said lens onto said lens aligner comprises a set of spring loaded pins, each pin being disposed essentially opposite to one of said alignment pins.

4. A system according to claim 1, wherein said frame gripper is adapted to center said lens at the center of said lens aligner when said lens is positioned laterally over said lens aligner.

5. A system according to claim 4 wherein said frame gripper comprises a crossed pair of arms connected in their central region by a pivot joint, each arm comprising a lens gripper at locations on said arm at opposite sides of said pivot joint, and wherein said frame gripper is disposed in said system such that said pivot joint lies at the center of said lens aligner when said frame gripper is in its central position.

6. A system according to claim 5 wherein said arms comprise gripping elements at or near their extremities, said gripping elements being adapted to grip the edges of said lenses.

7. A system according to claim 5 wherein said arms are spring loaded in such a manner as to bias them to grip the edges of said lenses.

8. A system according to claim 5 wherein said frame gripper comprises at least one of a ratchet locking mechanism adapted to hold said spring-loaded arms open until said ratchet is released, and a support wire positioned beneath said arms, such that said spectacles are supported thereon while not yet gripped by said frame gripper.

9. A system according to claim 5 wherein said pivot lies on a line joining the centers of both lenses of said spectacles when gripped in said frame gripper.

10. A system according to claim 1, wherein said lens aligner defining said plane perpendicular to the path of said light beam enables measurement of said lens to be performed normal to at least one of the surfaces of said lens independent of either of the optical sag or tilt of said lens.

11. A system according to claim 1, wherein said journal and bush bearing comprises a cylindrical journal attached to said frame gripper, adapted to rotate within a bush bearing formed in a base assembly, said base assembly being attached serially with said double pivot assembly to a mounting assembly connected to horizontal and vertical movement slides on said system.

12. A system according to claim 1, wherein said double pivot assembly comprises a base assembly to which said frame gripper is rotatably attached, said base assembly being attached at each of its sides by a first pivot joint to a pivot arm, said pivot arm on each side of said double pivot assembly being attached at an end remote from said first pivot joint by means of a second pivot joint to a mounting assembly connected to horizontal and vertical movement slides on said system.

13. A system according to claim 1, further comprising an actuator element attached to a controlled vertical motion mechanism, wherein said mechanical structure is attached flexibly to said actuator element, such that when said actuator element is lowered, said mechanical structure is also lowered.

14. A system according to claim 13, wherein said controlled vertical motion mechanism also lowers said mechanism for pressing said lens into position on said lens aligner.

15. A system according to claim 1, further comprising a controlled horizontal motion mechanism, such that said frame gripper can be moved laterally between lenses.

16. A system according to claim 1, further comprising control circuitry adapted to control said vertical and horizontal motion mechanisms in conjunction with said optical analyzing unit for analyzing the light beam after transmission through said lens, such that said measurement of the optical properties of spectacle lenses is performed on both lenses sequentially and automatically.

17. A system according to claim 1, wherein the position of the pivot of the arms of said frame gripper is configured such that the mechanical center of each lens is aligned longitudinally with the axis of said light beam when said lens is positioned over said lens aligner.

18. A system according to claim 1, wherein said frame gripper rotates freely about both axes orthogonal to the path of said light beam, and allows free vertical motion of said spectacles before pressing of said lens onto said lens aligner.

19. A system according to claim 1, wherein said roll motion and said pitch motion are aligned along orthogonal axes, each being orthogonal to the path of said light beam.

* * * * *